United States Patent
Wittmann

(10) Patent No.: US 11,305,469 B2
(45) Date of Patent: Apr. 19, 2022

(54) METHOD FOR PRODUCING AN INTERIOR UNIT FOR A MOTOR VEHICLE, AND INTERIOR UNIT FOR A MOTOR VEHICLE

(71) Applicant: Lisa Draexlmaier GmbH, Vilsbiburg (DE)

(72) Inventor: Thomas Wittmann, Vilsbiburg (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 213 days.

(21) Appl. No.: 16/542,733

(22) Filed: Aug. 16, 2019

(65) Prior Publication Data

US 2019/0366601 A1 Dec. 5, 2019

Related U.S. Application Data

(63) Continuation of application No. PCT/EP2018/053257, filed on Feb. 9, 2018.

(30) Foreign Application Priority Data

Feb. 17, 2017 (DE) .................... 10 2017 103 292.4

(51) Int. Cl.
*B60R 13/02* (2006.01)
*B29C 44/56* (2006.01)
(Continued)

(52) U.S. Cl.
CPC .......... *B29C 44/5627* (2013.01); *B29C 44/08* (2013.01); *B29C 45/0081* (2013.01);
(Continued)

(58) Field of Classification Search
CPC . B29C 44/5627; B29C 44/08; B29C 45/0081; B29C 45/16; B29C 2045/0093;
(Continued)

(56) References Cited

U.S. PATENT DOCUMENTS

| 2006/0222841 | A1 | 10/2006 | Masumizu et al. |
| 2016/0288674 | A1 | 10/2016 | Mizuno et al. |
| 2018/0079372 | A1* | 3/2018 | Iwasaki .................. D05B 93/00 |

FOREIGN PATENT DOCUMENTS

| DE | 3737230 | 5/1989 |
| DE | 10160173 | 6/2003 |

(Continued)

OTHER PUBLICATIONS

Machine Translation of EP 2399784A1 by Sato Takahiro and Akaba Shogo. "Component part mounting structure". (Year: 2011).*

(Continued)

*Primary Examiner* — Nirvana Deonauth
(74) *Attorney, Agent, or Firm* — Burris Law, PLLC

(57) ABSTRACT

A method for production of an interior unit for a motor vehicle includes production of a support by injection molding, featuring an enclosed front side, wherein at a backside of the support a screw boss is formed whose drill hole is sealed by a support section in the direction of the front side of the support, which support section features a reduced wall thickness in comparison to the remainder of the support, and production of a foam layer on the enclosed front side of the support. Furthermore, the present disclosure relates to an interior unit for a motor vehicle.

9 Claims, 2 Drawing Sheets

Figure 1:
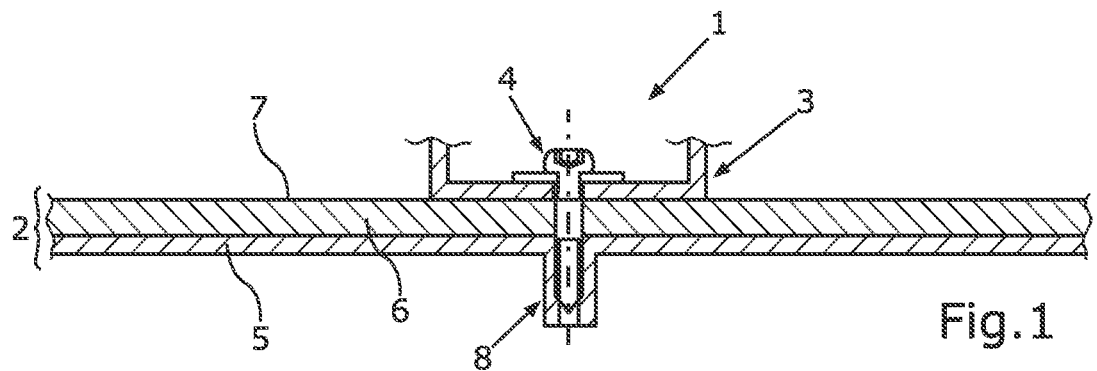

(51) Int. Cl.
*B29C 44/08* (2006.01)
*B29C 45/00* (2006.01)
*B29C 45/16* (2006.01)
*B32B 5/20* (2006.01)
*B32B 27/06* (2006.01)
*B32B 27/32* (2006.01)
*B32B 27/40* (2006.01)
*F16B 5/02* (2006.01)
*F16B 37/00* (2006.01)
*B29K 23/00* (2006.01)
*B29K 75/00* (2006.01)
*B29K 105/04* (2006.01)
*B29L 31/30* (2006.01)

(52) U.S. Cl.
CPC .............. *B29C 45/16* (2013.01); *B32B 5/20* (2013.01); *B32B 27/065* (2013.01); *B32B 27/32* (2013.01); *B32B 27/40* (2013.01); *F16B 5/02* (2013.01); *F16B 37/005* (2013.01); *B29C 2045/0093* (2013.01); *B29K 2023/12* (2013.01); *B29K 2075/00* (2013.01); *B29K 2105/04* (2013.01); *B29L 2031/3005* (2013.01); *B32B 2266/0278* (2013.01); *B32B 2605/003* (2013.01); *B60R 13/02* (2013.01)

(58) Field of Classification Search
CPC ......... B32B 5/20; B32B 27/065; B32B 27/32; B32B 27/40; B32B 2266/0278; B32B 2605/003; F16B 5/02; F16B 37/005; B29K 2023/12; B29K 2075/00; B29K 2105/04; B29L 2031/3005; B60R 13/02
See application file for complete search history.

(56) References Cited

FOREIGN PATENT DOCUMENTS

| | | |
|---|---|---|
| DE | 202009006239 | 10/2010 |
| EP | 2399784 | 12/2011 |
| EP | 2556940 | 2/2013 |
| JP | 2007161014 | 6/2007 |

OTHER PUBLICATIONS

Machine Translation of DE3737230A1 by Dietz Guenter; Falkenroth Heinz-Juergen. "Fastening of two components on one another by means of screws or similar fastening elements". (Year: 1989).*

Machine Translation of JP2007161014 by Watabe Akinori. "Interior Trimming Component Mounting Structure". Jun. 28, 2007 (Year: 2007).*

International Search Report for International Application PCT/EP2018/053257, dated Apr. 23, 2018.

* cited by examiner

METHOD FOR PRODUCING AN INTERIOR UNIT FOR A MOTOR VEHICLE, AND INTERIOR UNIT FOR A MOTOR VEHICLE

CROSS-REFERENCE TO RELATED APPLICATIONS

This application is a continuation of International Application No. PCT/EP2018/053257, filed on Feb. 9, 2018, which claims priority to and the benefit of DE 10 2017 103 292.4, filed on Feb. 17, 2017. The disclosures of the above applications are incorporated herein by reference.

FIELD

The present disclosure relates to a method for production of an interior unit for a motor vehicle and to an interior unit for a motor vehicle.

BACKGROUND

The statements in this section merely provide background information related to the present disclosure and may not constitute prior art.

Interior units for motor vehicles, such as instrument panel supports for instance, are increasingly often being produced from composite materials, especially from fiber-reinforced plastics, inter alia for reasons of weight savings. Composite materials of this kind frequently also feature a middle, foamed layer, which contributes inter alia to a particularly valuable haptic impression in the vehicle interior.

Often for example, attachment parts such as decorative strips or such, are screwed to instrument panel supports. In order to enable a reliable screw connection, items known as screw clips are often used. A screw clip is often arranged in the region of a drill hole of an instrument panel support and acts as an opposing part for a screw, by which an attachment part can be fastened to the instrument panel support. The attachment and use of these screw clips is relatively complicated and has a negative impact on the assembly time and costs, among other factors.

SUMMARY

The present disclosure simplifies the screwing of attachment parts to interior units produced from composite materials.

With the inventive method for production of an interior unit for a motor vehicle, a support featuring an enclosed front side is produced by injection molding, wherein at a backside of the support a screw boss is formed whose drill hole is sealed by a support section in the direction of the front side of the support, which support section features a reduced wall thickness in comparison to the remainder of the support. In addition, in the process of the method according to the present disclosure, a foam layer is produced on the enclosed front side of the support.

The support featuring the screw boss is thus produced by injection molding, wherein one particularly significant aspect of the present disclosure is that the drill hole of the screw boss is formed, in the course of the injection molding method, as being enclosed in the direction of the front side of the support. This is achieved in that the stated support section encloses the drill hole in the direction of the front side of the support. Because the support section features a reduced wall thickness in comparison to the remainder of the support, the support section can be pierced or separated in a particularly simple manner as soon as a screw has to be screwed into the drill hole of the screw boss in order to screw an attachment part onto the interior unit.

Because the interior unit firstly features the support and secondly the foam layer, it is important that the front side of the support is enclosed during the production of the interior unit. Thus, during the foaming process and the production of the foam layer on the support, no foam can penetrate through the support. Since the drill hole of the screw boss is enclosed by the support section in the direction of the front side of the support, in the region of the screw boss, no foam material can pass through the support during the production of the foam layer.

Due to the provision of the screw boss, which acts as a screw-in support or screw cone for a screw, an attachment part can be screwed to the interior unit in a particularly simple and uncomplicated manner. During the production process of the interior unit, the support section enclosing the drill hole in the direction of the front side of the support forms a kind of film through which no foam can pass during the production of the foam layer. However, this film-like support section can be pierced relatively easily by a screw as soon as an attachment part is to be screwed on after completion of the interior unit. The screw clip mentioned above can thus be omitted due to the method according to the present disclosure, thus the work step of setting on or positioning of the screw clip is also omitted. In addition, because the support section features a reduced wall thickness, the amount of generated waste can be reduced.

According to one favorable variation, the present disclosure provides that after the production of the foam layer, the support section enclosing the drill hole of the screw boss is pierced by a punching tool. In one aspect, during the punching process additional regions of the support will be punched out. If the produced interior unit pertains to an instrument panel support, for example, then a plurality of recesses or passage openings will have to be produced at those locations where certain components, such as displays, control elements and such, are to be accommodated. The support section enclosing the drill hole of the screw boss can be punched out in a particularly simple manner since this section features a reduced wall thickness. With the punching tool, a die can be omitted at that location where the support section is to be punched out in order to expose the drill hole of the screw boss in the direction of the front side. Due to the smaller thickness of the support section, it can even be pierced without a die. Instead of piercing the support section by a punching tool, alternatively it is also possible, after producing the foam layer, to pierce through the support section enclosing the drill hole of the screw boss with a screw which is screwed into the drill hole of the screw boss for fastening of the attachment part to the interior unit. Thus, in other words it is also possible that the support section enclosing the drill hole of the screw boss can be easily pierced with the point of a screw which is being used for fastening of an attachment part to the interior unit. In one aspect, a self-tapping screw is used which itself forms an opposing, chipless thread when screwed into the sealed core hole, that is, the drill hole, of the support section due to its special thread geometry. Thus, self-tapping screws act as a positive-locking mechanism. When using a self-tapping screw, the method step of thread cutting in the screw boss can be omitted, which is associated with additional advantages of time and cost.

An additional advantageous variation of the present disclosure provides that a decorative layer is produced on a side of the foam layer facing away from the support. Thus, in one form the interior unit is constructed from three different layers, namely the decorative layer and the support, wherein the foam layer is produced between the decorative layer and the support. In another form, the decorative layer is pierced in a region of the drill hole of the screw boss such that in the subsequent screwing process, a screw can be inserted very easily through the decorative layer. In one form, the decorative layer is pierced above the drill hole in the region of the screw boss.

In an additional favorable variation of the present disclosure, the decorative layer is produced by spray application or powder sintering. With the spray application, for example, one tool half is prepared which reproduces the contour of the decorative layer to be produced. Then by using a spray head, the material used for preparation of the decorative layer is applied onto the tool. Thus, a particularly large design freedom is attained in structuring the decorative layer, so that very different shapes can be created in a simple manner. In the powder sintering method, also known as powder slush or slush molding, the decorative layer is produced by primary shaping. In this case a pleasing optical or haptic surface can be obtained, since different surface textures, such as faux leather, can be obtained from the used tool. A thermoplastic elastomer, for example, based on urethane, olefin or polyester, or also PVC for instance, can be used as starting material. First a tool is heated. Then the heated tool is brought into contact with the synthetic powder which adheres to and is sintered to the tool wall. By rotating and pivoting the tool, a uniform thickness of the decorative layer is obtained. Next, excess powder can be shaken off. Then the adhered powder is heated in order to form a complete gel. After cooling of the tool, the decorative layer can be removed. In contrast to the rotation melting method, no hollow body is created here, but rather a thick-wall foil which has the shape of the tool.

An additional favorable variation of the present disclosure provides that the support is produced from a fiber-reinforced thermoplastic material. In one form, a long-stranded reinforced polypropylene is used. Compared to short-fiber reinforced thermoplastics, the elongated-fiber reinforced thermoplastics possess a greater impact resistance and their creep tendency is also significantly less, which favors their use when elevated quality is desired, as in the interior region in the automobile industry.

In one form, the foam layer is produced from polyurethane foam. The decorative layer can likewise be produced from a polyurethane base, for example.

The interior unit for a motor vehicle according to the present disclosure comprising a support, features an enclosed front side and has on its back side a screw boss whose drill hole is sealed in the direction of the front side of the support by a support section which features a reduced wall thickness in comparison to the remainder of the support, wherein a foam layer is applied onto the enclosed front side. Favorable variations of the method according to the present disclosure are to be deemed as favorable variations of the invented interior unit and vice-versa.

Furthermore, the present disclosure relates to a screw connection which comprises the invented interior unit and a favorable variation of the invented interior unit and at least one attachment part, which is fastened to the interior unit by a screw screwed into the drill hole of the screw boss.

Additional advantages, features, and details of the present disclosure are evident from the following description of variations and also based on the drawings. The features and combinations of features named in the description and also the features and combinations of features indicated below in the description of figures and/or in the figures can be used not only in the combination cited or in other combinations or as individual features, without departing from the framework of the present disclosure.

Further areas of applicability will become apparent from the description provided herein. It should be understood that the description and specific examples are intended for purposes of illustration only and are not intended to limit the scope of the present disclosure.

DRAWINGS

Figure 2:
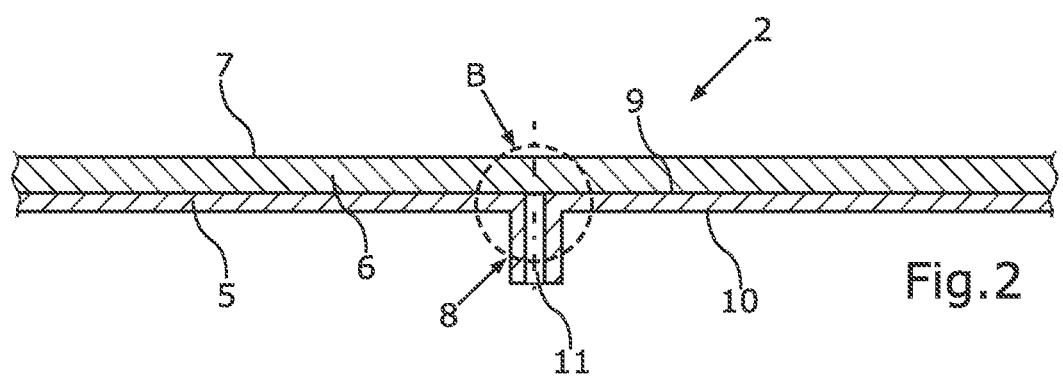
Figure 3:
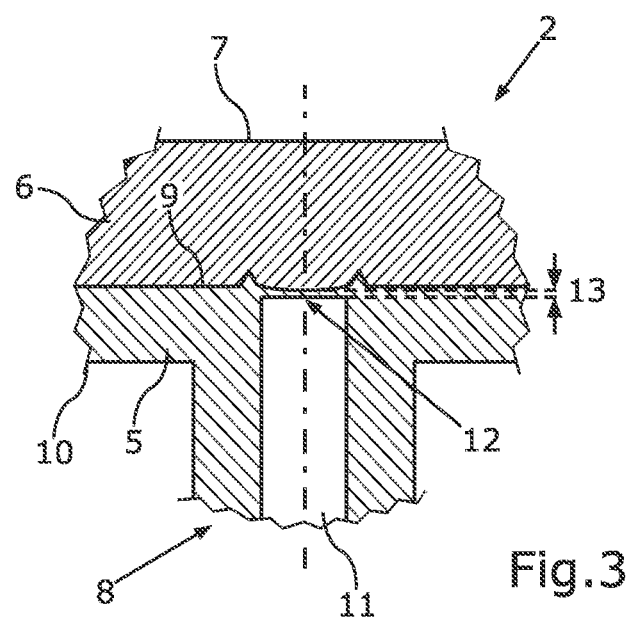

In order that the disclosure may be well understood, there will now be described various forms thereof, given by way of example, reference being made to the accompanying drawings, in which:

FIG. 1 is a cut-away, schematic side view of a screw connection which comprises an interior unit to which an attachment part is screwed, wherein the interior unit features a support, a foam layer and a decorative layer according to the present disclosure;

FIG. 2 is a cut-away, schematic side view which depicts exclusively the interior unit, which features the decorative layer, the foam layer and the support, wherein a screw boss is formed at its underside according to the present disclosure; and FIG. 3 is an enlarged view is depicted of the region of the screw boss which features a drill hole which is enclosed by a support section in the direction of the foam layer according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A screw connection 1 is depicted in a cut-away, schematic side view in FIG. 1. The screw connection 1 comprises an interior unit 2 and an attachment part 3, which is fastened to the interior unit by a screw 4. The interior unit 2 features a multiple layer structure. In this regard the interior unit 2 comprises a support 5, a foam layer 6 and a decorative layer 7. In addition, the support 5 features a screw boss 8, which acts as screw-in support and/or as screw cone for the screw 4, by which the attachment 3 is screwed to the interior unit 2. In one form, the support 5 is formed by injection molding.

The interior unit 2 can pertain to an instrument panel support, for instance, wherein the attachment part 3 can pertain to a decorative strip screwed to the instrument panel support. The side of the decorative layer 7 facing away from the foam layer 6 herein forms the visible side which vehicle passengers can see. Due to the provision of the integrated screw boss 8, the attachment part 3 can be particularly easily fastened to the interior unit 2.

FIG. 2 depicts the interior unit 2 solely in a cut-away schematic side view. As was already mentioned, in one form the support 5 is produced by injection molding and in one variation from an elongated-fiber reinforced polypropylene. In this regard the support 5 is produced with an enclosed front side 9, wherein in the course of the injection molding method the screw boss 8 is produced at the back side 10 of the support 5 as an integral constituent of the support 5. In another form, drill hole 11 of the screw boss 8 is produced directly in the course of the injection molding process.

FIG. 3 depicts the region B indicated in FIG. 2 in an enlarged cross-sectional view. During the production of the support 5 by injection molding, the drill hole 11 of the screw boss 8 is sealed in the direction of the front side 9 with a support section 12, which features a significantly reduced wall thickness 13 in comparison to the rest of the support 5. The entire front side 9 of the support 5 produced by injection molding thus does not feature any open passages at all. This is important so that during the subsequent production of the interior unit 2, the foam material from which the foam layer 6 is produced will not be pressed through the support 5.

The decorative layer can be produced, for example, by spray application or by powder sintering. For instance, the decorative layer 7 is placed into a lower tool (not depicted here), wherein subsequently the foam layer 6 is applied onto the decorative layer 7. The support 5 is accommodated in an upper tool (likewise not depicted here), wherein the upper tool and lower tool are then moved together. Thus, an enclosed membrane-foam-support is produced in the form of the interior unit 2.

After production of the interior unit 2 the support section 12 sealing the drill hole 11 of the screw boss 8 can be pierced by a punching tool. But alternatively, it is also possible to leave the support section 12 intact. In one form, the decorative layer 7 is pierced in a region arranged above the drill hole 11 of the screw boss 8. Thus, firstly the screw 4 can subsequently be inserted more easily through the decorative layer 7. And secondly, it is easy to see where the screw 4 is to be inserted through the decorative layer 7.

For instance, the decorative layer can feature a thickness of 1.5 mm, wherein the support section 12, which encloses the drill hole 11, can have a thickness of only 0.2 mm, for example.

In order to produce the screw connection 1 depicted in FIG. 1, the screw 4 is introduced through the pre-pierced decorative layer 7 from above the drill hole 11 of the screw boss 8. In this case the foam layer 6 can be relatively easily penetrated by the screw 4. The same also applies to the support section 12, since it features the very small wall thickness 13 mentioned above. In one form, the screw 4 pertains to a self-tapping screw, so that it forms its own thread in the drill hole 11 of the screw boss 8. A separate production step for cutting the thread of the drill hole 11 of the screw boss 8 can thus be omitted. Due to the provision of the screw boss 8, the attachment part 3 can thus be fastened very easily and quickly to the interior unit 2 by the screw 4.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for producing an interior unit for a motor vehicle comprising:
   a first step of producing a support by injection molding, the support having a front side, a back side, a screw boss at the back side, and a support section at the front side, the screw boss having a drill hole sealed by the support section at the front side, the support section including a reduced wall thickness in comparison to a remainder of the support;
   a second step of producing a foam layer at the front side of the support after the producing of the support by injection molding, the support section forming a continuous surface with the front side of the support and closing the drill hole at the front side of the support preventing the foam layer from entering the drill hole when the foam layer is produced at the front side of the support; and
   a third step, after the producing of the foam layer at the front side, wherein the support section is pierced or separated for receiving a screw into the drill hole of the screw boss for attachment of a part.

2. The method according to claim 1, wherein the support section is pierced by a punching tool.

3. The method according to claim 1, further comprising producing a decorative layer on a side of the foam layer facing away from the support.

4. The method according to claim 3, wherein the decorative layer is pierced through in a region of the drill hole of the screw boss.

5. The method according to claim 3, wherein the decorative layer is produced by spray application.

6. The method according to claim 3, wherein the decorative layer is produced by powder sintering.

7. The method according to claim 1, wherein the support is produced from a fiber-reinforced thermoplastic material.

8. The method according to claim 1, wherein the foam layer is produced from polyurethane foam.

9. The method according to claim 3, wherein the decorative layer is produced from polyurethane.

* * * * *